United States Patent [19]

McMahon

[11] 4,182,544

[45] Jan. 8, 1980

[54] RESONANT MULTIPLEXER-DEMULTIPLEXER FOR OPTICAL DATA COMMUNICATION SYSTEMS

[75] Inventor: Donald H. McMahon, Carlisle, Mass.

[73] Assignee: Sperry Rand Corporation, New York, N.Y.

[21] Appl. No.: 930,773

[22] Filed: Aug. 3, 1978

[51] Int. Cl.² .................. G02B 5/14; G02F 1/03; H04J 15/00
[52] U.S. Cl. .................. 350/96.16; 179/15 R; 179/15 BS; 350/96.14; 350/355
[58] Field of Search ............. 350/96.16, 96.14, 355; 250/199; 179/15 R, 15 BS

[56] References Cited

U.S. PATENT DOCUMENTS

| 4,139,259 | 2/1979 | Kersten et al. | 350/96.16 |
| 4,143,941 | 3/1979 | Soref | 350/96.16 |

OTHER PUBLICATIONS

Soref et al. "Active Failsafe Terminal For Fiber-Optic Data Bus" *Appl. Phys. Lett,* vol. 32, No. 7 Apr. 1978 pp. 408–410.

*Primary Examiner*—Stewart J. Levy
*Attorney, Agent, or Firm*—Howard P. Terry

[57] ABSTRACT

An improved optical data terminal device employs an array of multiple mode optical fiber guides as input-output devices, each abutted against a flat input-output focal face of an electrooptically active plate provided with opposed spiral-edged deflection modulation electrodes. Opposite the input-output focal face is a cylindrical mirror surface for refocussing the deflected light from any predetermined input fiber guide into a second one of the array of fiber guides selected by the voltage applied to the electrode pair. Resonant excitation of the deflection electrodes may be employed.

25 Claims, 13 Drawing Figures

RESONANT MULTIPLEXER-DEMULTIPLEXER FOR OPTICAL DATA COMMUNICATION SYSTEMS

BACKGROUND OF THE INVENTION

1. Field of the Invention

The invention pertains generally to the field of guided wave optical communication systems and more particularly relates to low loss optical-data single fiber switching devices for performing multi-mode or single-mode access coupling in data distribution networks, as well as multiplexing and demultiplexing functions in electro-optical data processing apparatus.

2. Description of the Prior Art

In the R. A. Soref U.S. patent application Ser. No. 856,424 now U.S. Pat. No. 4,143,941, for a "Low Loss Optical Data Terminal Device for Multimode Fiber Guide Optical Communication System," filed Dec. 1, 1977 and assigned to Sperry Rand Corporation, issued Mar. 13, 1979 as U.S. Pat. No. 4,143,941 it is observed that considerable past research has been directed to the fiber optic bundle and to single mode integrated techniques for use in optical data communication, but that more recent interest has turned to the alternative of the multi-mode, single optical fiber technology. The latter can be successfully applied to a wide variety of communication problems, especially where moderate band width and moderate distances are involved. Fabrication of passive interconnectors is simplified and the packing fraction losses characteristic of the fiber bundle method are eliminated. Although significant progress has been made in the single mode technology, important unsolved coupling problems are seen to remain.

Simple light sources exist easily capable of coupling considerable power into available multiple mode, single fiber guides, and adequate photodetector devices for detecting the flow of light through such single fiber guides are also available. Evidently, a scheme for multiple mode, single fiber communication would be made useful if adequate concepts existed for electrically controlling the routing of optical signals, so that data bussing, multiplexing, demultiplexing, and switching functions could be performed totally in the optical domain by reliable and inexpensive devices.

In the Soref patent application, there is described just such an active reciprocal optical device finding utility in optical processing, for example. It includes a lineal array of multiple mode optical fiber input-output guides abutted against a flat input-output focal face of an electrooptically active plate provided with appropriate deflection modulation electrodes on each of its two broad faces perpendicular to the plane of the focal face. Opposite that input-output face is a curved mirror surface for refocussing TE and TM multi-mode light from a predetermined input fiber guide into a second one of the array of fiber guides as selected by the voltage applied to cooperating sets of essentially symmetric angular electrodes.

SUMMARY OF THE INVENTION

The present invention is an improvement over the Soref device, an improvement which employs deflection electrodes of novel character, together with excitation which may be resonant at one or more different frequencies of those deflection electrodes. Again, the present device employs optical fiber input-output guides abutting against a planar input-output focal face. The curved mirror surface of Soref again appears opposite the input-output face for refocussing both TE and TM mode light from a predetermined input fiber guide into a selected one of the remainder of the fibers of the array. The invention again benefits from the simplicity of multi-mode coupling, and now provides improved focussing of the light to a much more sharply defined spot so that nearly all of the light source energy is usefully employed. The device is generally achromatic in nature and is bidirectional, so that it may be employed interchangeably for multiplexing or for demultiplexing. With respect to the original Soref device, the present invention readily demonstrates improved insertion loss; low voltage and power drive requirements are attained by a resonant excitation system, drive voltage being reduced by a factor of approximately one hundred. Furthermore, greatly eased manufacturing tolerances are afforded. Improved performance is also yielded with respect to the optical signal-to-cross talk ratio.

DESCRIPTION OF THE PREFERRED EMBODIMENTS

Figure 1:
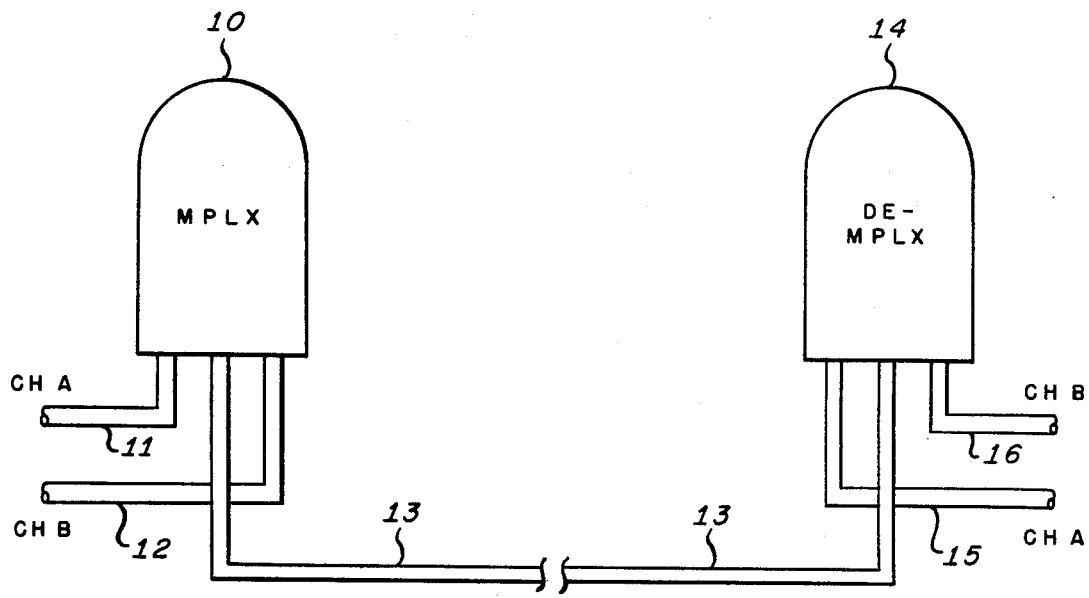
FIG. 1 is a block diagram showing components and optical interconnections of the components of a simple electrooptic data multiplexing system.

The voltage controllable optical switching device of the present invention finds a wide variety of applications in optical processing systems such as those in which the optical signals from a plurality of transmitter-receiver devices are to be transmitted simultaneously between two remote locations. FIG. 1 illustrates, in a general way, an application of the invention for multiplexing and demultiplexing data flowing in the form of optical pulses from channels A and B through the respective optical fiber input wave guides 11 and 12 into a multiplexer 10 according to the present invention for multiplexed transmission to a remote location via optical fiber wave guide 13. At the remote location is disposed a demultiplexer 14 having the same internal structure as multiplexer 10. The optical fiber wave guide 13 serves as an input to demultiplexer 14, wherein the chains of pulsed signals are separated and switched back again into the Channels A and B represented by the respective optical fiber output wave guides 15, 16. It will be apparent to those skilled in the art that the multiplexing and demultiplexing operations in devices 10 and 14 will normally be synchronous, as will be further discussed in connection with FIG. 13.

In order to realize an active multi-mode optical data communication multiplexing device that has desirably low insertion loss and has other worthy attributes, normal incidence of light within an optical fiber is provided into the device and a mirror arrangement is then used for efficient one-dimensional focussing of the now divergent incident light into a predetermined output fiber or fibers. Accordingly, the novel active switching devices of the present invention may be identified as mirror terminal devices having utility in many applications, including those of the kind discussed in the aforementioned patent application Ser. No. 856,424.

Figure 2:
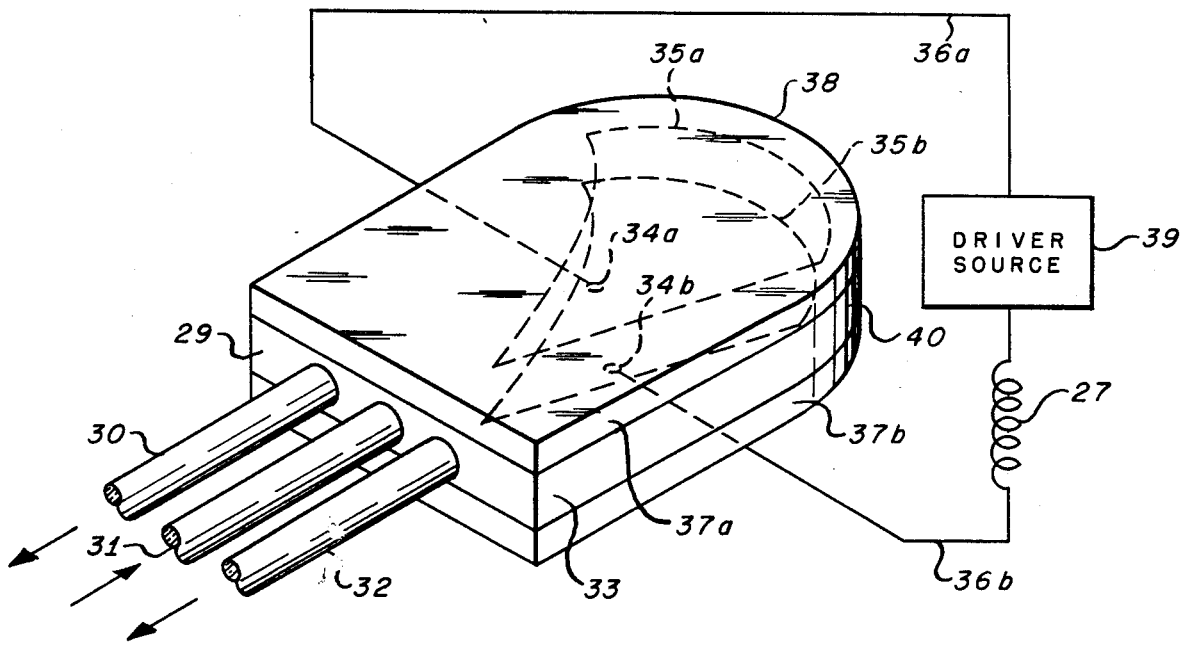
FIG. 2 is a perspective view of the novel multiplexer-demultiplexer of the present invention.

Referring especially to FIG. 2, a first embodiment of the novel mirror switching device will be explained. Its active element is a plate 33 of a conventional electrooptically active material such as a Z-cut single crystal plate of LiTaO$_3$ or LiNbO$_3$ lying between a pair of one sixteenth inch thick protective glass plates 37a, 37b cemented on the opposed sides of the plate 33. Glycol phthalate or a similar optically transparent cement may be used in the two interfaces between plate 33 and plates 37a and 37b. The thickness of the crystal plate 33 is selected approximately to match the core diameter of the multi-mode fiber guides to be used in the associated system.

The input-output end 29 of the mirror terminal device is ground and polished to have substantially optical flat characteristics. The end 38 of plate 33 opposite flat end 29 is ground and optically polished in one form of the invention into a circular cylindric shape. A metal coating of good optically reflecting nature is applied by vacuum evaporation or by other well known processes to the curved end 38 to form a totally cylindrical reflecting mirror 40. Mirrors formed of metals such as gold, chromium, silver, or aluminum may be employed.

An array of individual optical fiber guides with their faces cut and polished at right angles to their respective axes, such as fibers 30, 31, 32. is disposed with the faces directly contacting flat surface 29, so that the individual fiber guides are efficiently butt-coupled to the flat surface 29 at normal optical incidence. While three such fiber guides are shown in FIG. 2, from one to four or more fiber guides may be used in actual practice, depending upon the application of the mirror terminal device. In FIG. 2, the illustrated fiber guides include, for example, a bus input 31, a bus output 30, and an alternative bus output fiber 32, these fibers respectively corresponding to fiber guides 13, 15 and 16 of FIG. 1, for example. To control by modulation the multi-mode light passing in FIG. 2 from bus input 31 through the mirror terminal device into output bus 30, and therefore consequently to control the light passing out of fiber 32, metal electrically-conductive electrodes 35a, 35b, shaped as yet to be described, are placed on opposed sides of the active plate 33 using a conventional photolithographic process. Electrodes 35a, 35b may take various shapes, as will be further discussed, and are often oppositely charged, as by the electrical signal source 39 via leads 36a, 36b and terminals 34a, 34b.

Figure 3:
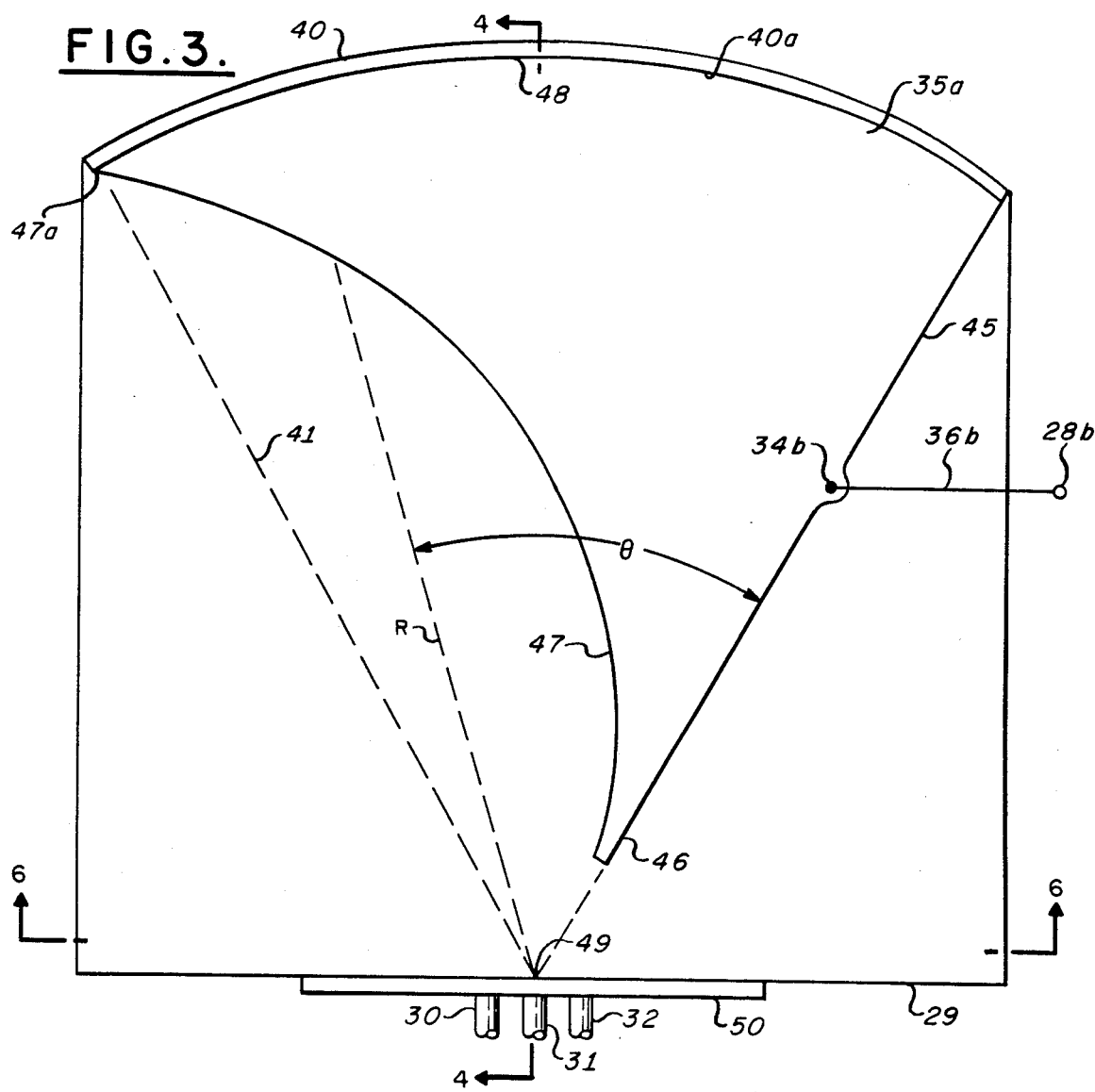
FIG. 3 is a plan view of the device of FIG. 2.
Figure 4:
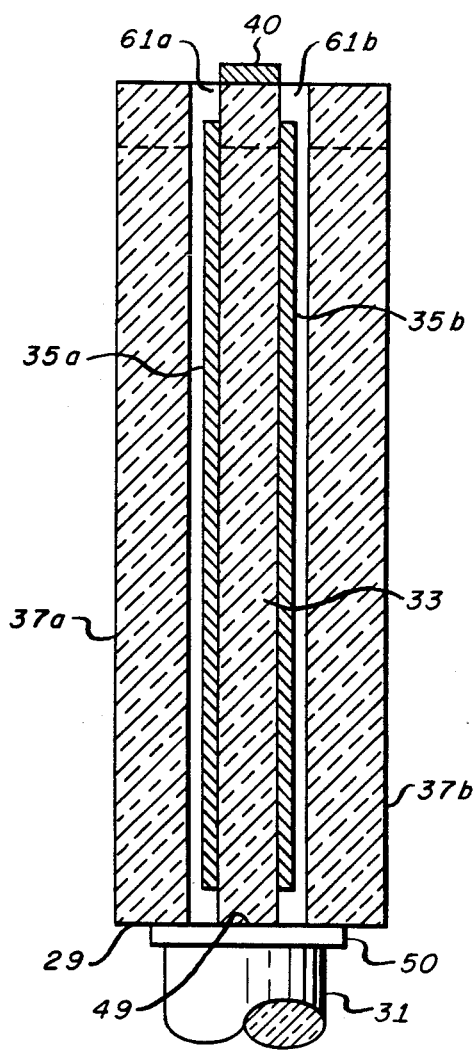
FIG. 4 is a cross-section view of the invention taken along the lines 4—4 of FIG. 3.

FIGS. 3 and 4 provide plan and side views of an embodiment of the novel mirror terminal cooperating with light flowing, for example, in any of three associated fiber guides 30, 31, 32. The side view shown in FIG. 4 illustrates the butt coupling relation of fiber guide 31, for example, with respect to the flat face 29 of the terminal. The view shows how the flat end of fiber 31, including its surrounding cladding, interfaces intimately with face 29 of active plate 33 in butt-coupled relation, the actual interfaces being made by a very thin transparent layer of glycol phthalate, for example, or of another high index liquid which may also be used to fill minor voids in the structure of FIG. 4 such as at 61a, 61b at the ends of thin-film electrodes 35a, 35b.

In FIGS. 3 and 4, it will be understood that the multimode light emitted generally at point 49 by fiber guide 31, for example, into the active plate 33 diverges in the plane of the drawing of FIG. 3 between dotted line 41 and edge 45, but is highly trapped by multiple reflection between dielectric interfaces with layers 37a, 37b in the plane of the drawing of FIG. 4, whose width dimensions are exaggerated for clarity. Thus, cylindrical mirror 40 performs one-dimensional refocussing of the light striking it in the absence of an electrical field in plate 33 generally at focal point 49 at which the input fiber guide 31 is located. In general, cylindric mirror 40 is so constructed as to focus a spot of light originating at surface 29 on another point of that surface. In the other plane shown in FIG. 4, the trapped light is multiply reflected at the surfaces of plate 33 and is therefore generally all focussed at point 49. As is well known, optical guides such as guides 30 through 32 propagate energy in both optical polarizations and in many modes of propagation. However, all of this energy is readily reflected to focal point 49 in the same manner by mirror 40.

The purpose of the novel mirror switching device is to tap off the internally and generally symmetrically located fiber light cone and to regather completely at least one polarization of the multi-mode light into an output fiber guide such as at 30 or 32. In view of the properties of mirror 40, it is seen that one-to-one imaging of the fiber light is achieved by making end 29 of the active plate 33 flat. Simple mirror equations show that the desired one-to-one refocussing of fiber light, whether of TM or TE mode, occurs on a focal plane located at a distance $R_o$ from the vertex of mirror 40 (see FIG. 5). The distance $R_o$ is the radius of curvature of mirror 40, where the center of curvature 49 is preferably disposed on the flat input-output focal plane 51a.

Figure 7:
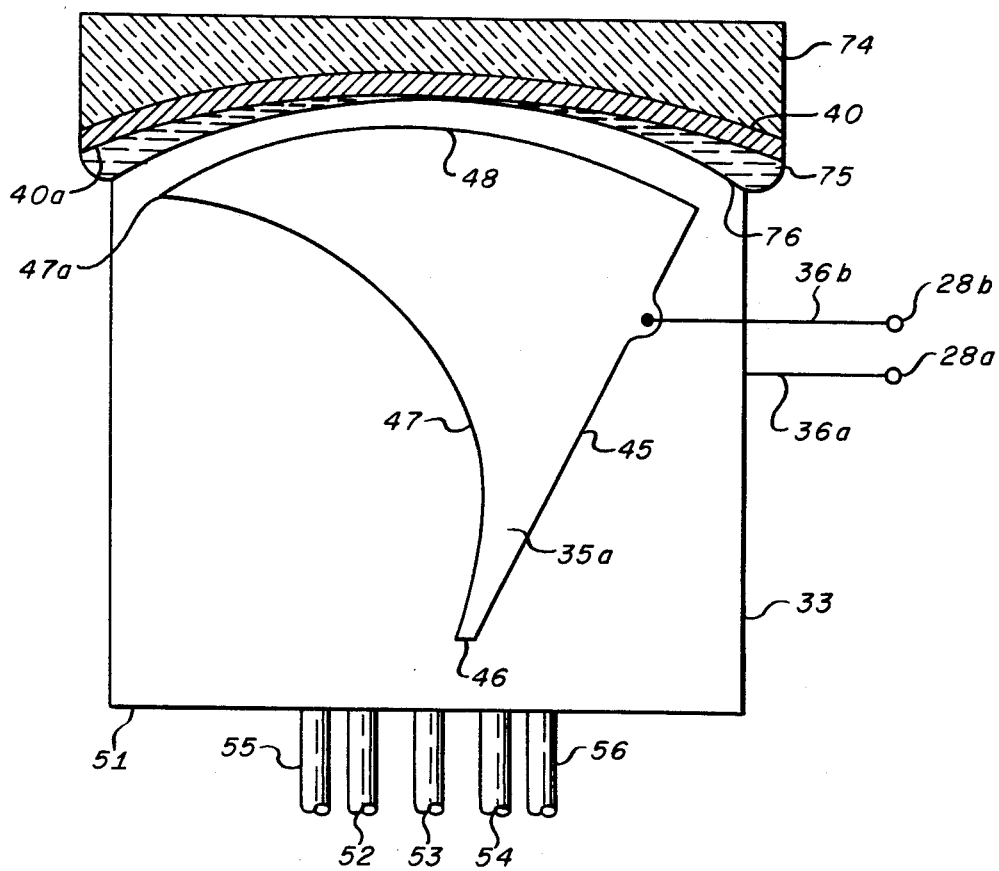
FIGS. 7 and 8 are plan views of alternative forms of the FIG. 2 configuration.
Figure 8:
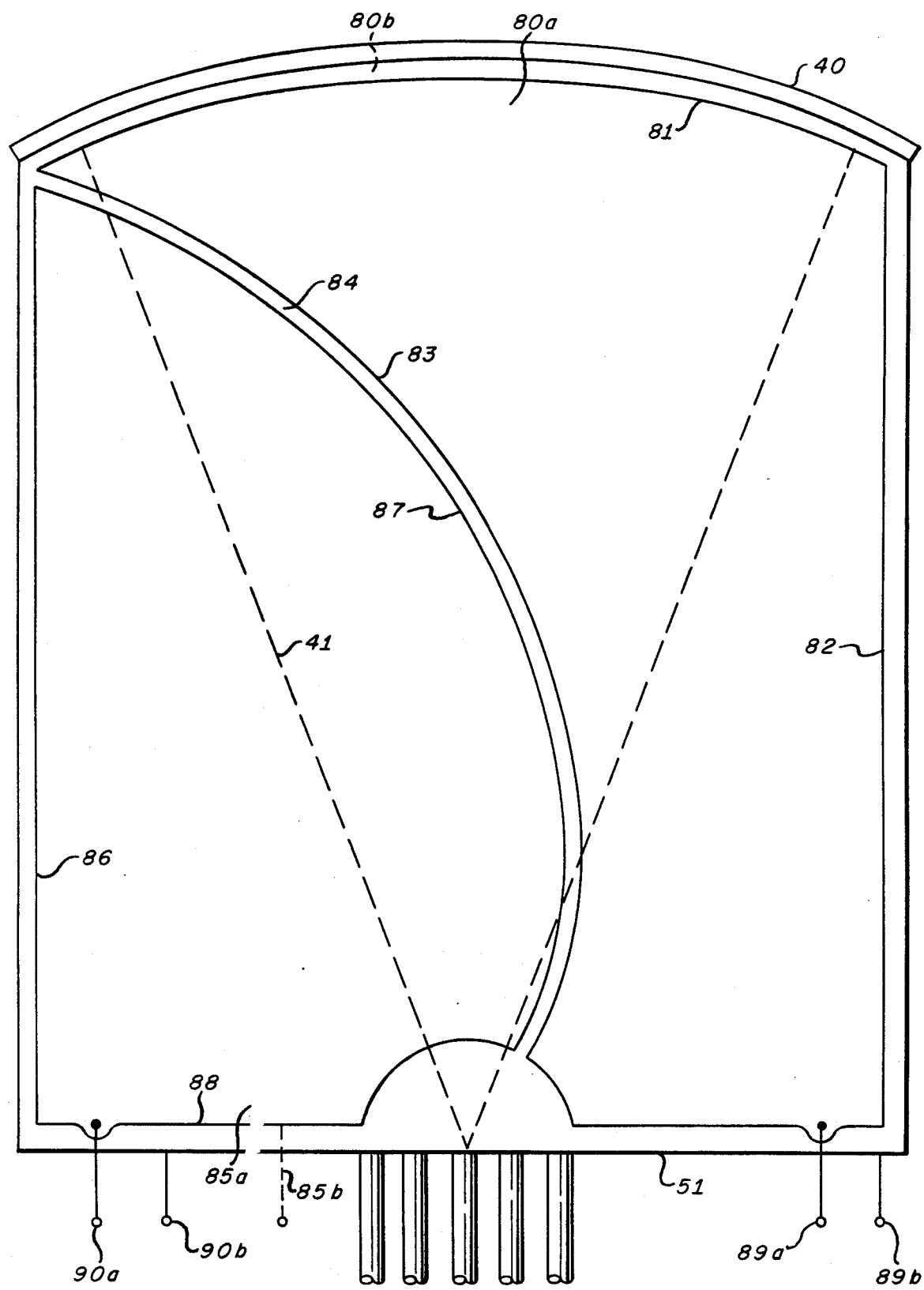
Figure 10:
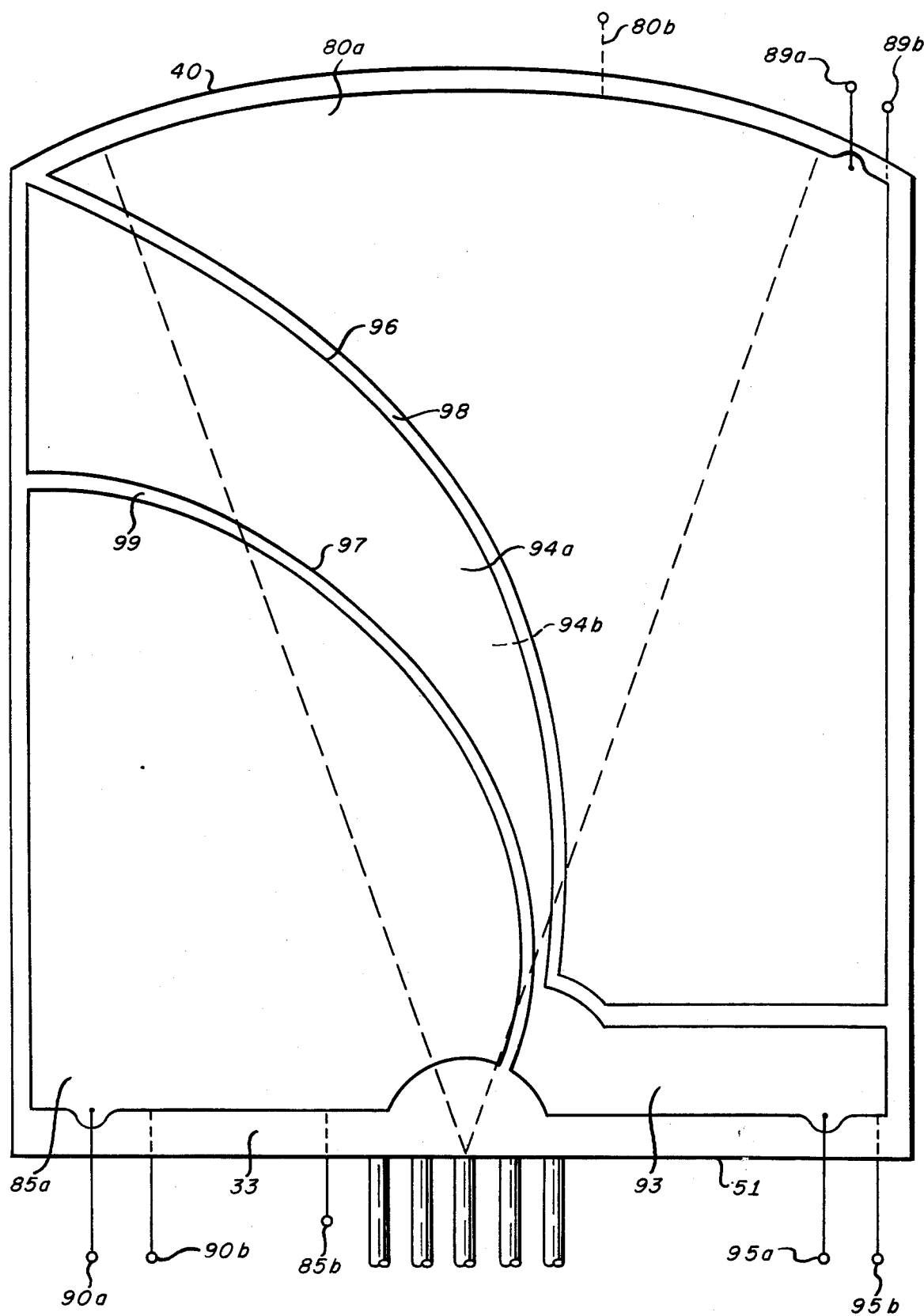
FIG. 10 is an alternative to the device of FIG. 8.

In FIG. 2, generalized electrodes 35a, 35b, were shown for altering the index of refraction of the active plate 33 therebetween in a novel manner and consequently for deflecting the refocussed light from the input or bus fiber guide 31 to one of the output fiber guides 30, 32, for example. FIGS. 7, 8, and 10 show particular sets of similar electrodes which may also be used to multiplex or to demultiplex optical energy. Combinations of various shapes are made as metal patterns, typically of gold, and are affixed to the opposed large faces of crystal plate 33, registered directly opposite each other. For this reason, the crystal plate 33 is Z cut so that the electric field between the opposed electrodes 35a, 35b is mainly parallel to the Z axis, thus achieving the largest possible electrooptic variation of the refractive index of the active plate 33 between electrodes 35a, 35b for light polarized in the Z axis direction. When the electric field across plate 33 is zero, the energy flowing in FIG. 3 from the input fiber guide 31 to guides 30 or 32 is substantially zero. In the aforegoing example, the flow of light from fiber guide 31 to fiber guide 30 or to the fiber guide 32 is maximized in the presence of a predetermined electrical field between electrodes 35a, 35b. Because focussing is accomplished largely in an achromatic fashion by mirror 40 and by wave guiding between the parallel interfaces 35a, 35b, and because the refractive deflection effect produced by the electric field is not seriously frequency sensitive, the active modulation is substantially wave length insensitive, and the device is essentially achromatic over near-infrared and visible wave lengths. Propagation losses due to the electrodes themselves are very low if they are made of a material such as gold.

Electrodes 35a, 35b are of similar shape and are placed in aligned relation, one directly opposite the other. The edges 47 of electrodes 35a, 35b are designed in a novel manner as will be described in connection with FIGS. 3, 5, and 6; these edges are active in beneficially diverting the light cone from guide 31 selectively, for example, into fiber guides 30 or 32. In FIG. 3, the active edges 47 of the upper and lower electrodes 35a, 35b, when the latter are excited by an appropriate voltage therebetween, form relatively abrupt discontinuities in the index of refraction affecting the light passing through plate 33. As in FIGS. 5 and 6, the differential refractive bending $\delta\theta$ of a light ray incident at edge 47 is given by Snell's law. Thus, in the small angle approximation and where $\theta$ is the angle between the direction of ray 62 and electrode edge 47, Snell's law states in the small angle approximation that:

$$\Delta n = n_1 - n = n\left(\frac{\theta^2}{2} - \frac{\theta_1^2}{2}\right) = n\frac{\theta_c^2}{2} \quad (1)$$

for:

$$\Delta n, \theta, \theta_1 << 1$$

and where $\Delta n$ is the electric field-induced change in the index of refraction n. In equation (1), $\theta$ and $\theta_1$, respectively, refer to the angles of incidence and of refraction with respect to edge 47 and $\theta_c$, defined by Equation (1), is the critical angle for internal reflection. It will be understood from equation (1) that small index discontinuities produce large refractive effects only for very small values of the angles $\theta$ and $\theta_1$. The size of the index of refraction discontinuity that can be produced electro-optically at edges 47 by placing an electric field between electrodes 35a, 35b is inherently limited by the electric field breakdown characteristics of crystal 33 to substantially $\Delta n = 10^{-3}$. Maximum refraction occurs for $\theta_1 =$ zero, for which case, the total deflection angle is $\theta_c$.

If it is assumed that the desired optical switching structure can be designed using triangular electrodes with edges 47 that are straight lines, as was done by Soref, it will be seen that the progressively changing angle of incidence of light from a given fiber guide, such as fiber guide 31, must necessarily produce, in view of Equation (1), a progressively varying refractive effect with the result that the light from the selected source 49, for example, cannot actually be refocussed to a small or sharply defined spot on surface 29, so that the straight line edges 47 are not preferred for precision applications in which light is to be refocussed to a single point whose location depends upon the electrode voltage.

Figure 5:
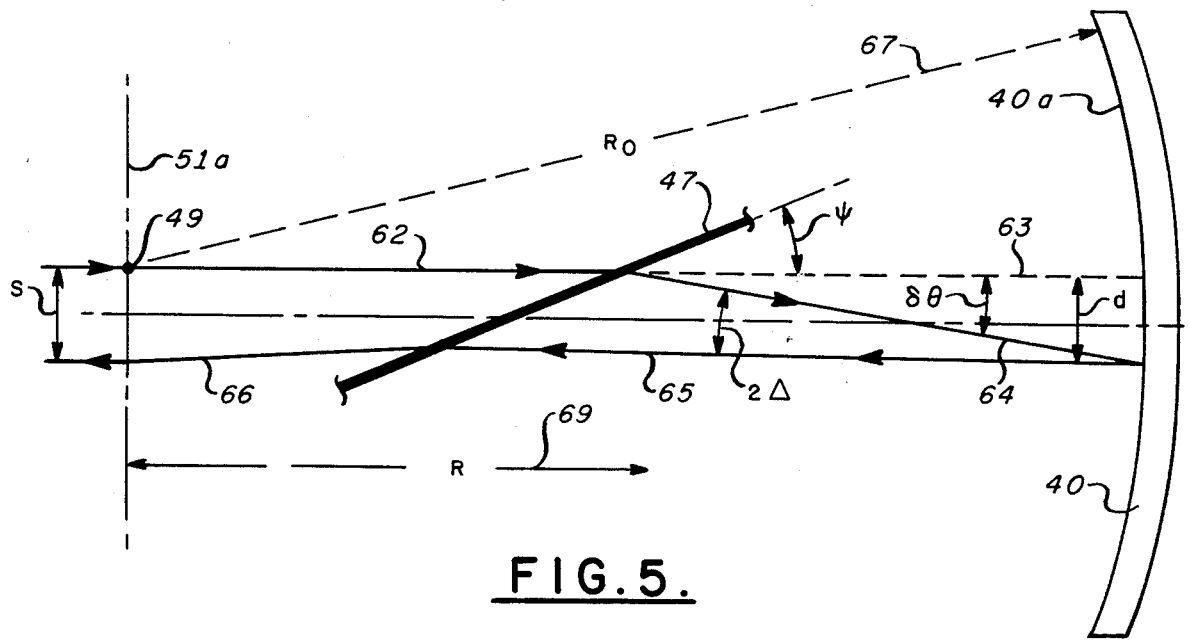
FIGS. 5 and 6 are diagrams useful in explaining the design and operation of the invention.

Referring to FIG. 5, a light ray 62, which is a median ray of the incoming beam, is seen entering plate 33 at point 49, being refracted by the index discontinuity at edges 47 of the electrode pair to form the deflected ray 64 which is, in turn, reflected by cylindrical mirror 40. The ray 65 reflected from mirror 40 is again refracted as it passes between edges 47 to form ray 66. Ray 64 is displaced by a distance d from the extension 63 of the original ray 62 and passes out through surface 51a as ray 66 displaced from input ray 62 by a distance S at surface 51a. The angle $\psi$ is the local angle between the index discontinuity at 47 and the input light ray 62, $\delta\theta$ is the angle change produced by the passage of ray 62 through that discontinuity, and $2\Delta$ is the angle between the rays incident and reflected from the curved surface of cylindrical mirror 40. Further the length $R_o$ of vector 67 is the radius of curvature of the inner surface 40a of mirror 40 and R is the distance 69 between the input-output face 51a and the intersection of light ray 62 with the index discontinuity at 47.

Again, using Snell's law for small angle conditions:

$$n \cos \psi = n_1 \cos (\psi + \delta\theta) \quad (2)$$
$$= (n + \delta n)(\cos \psi - \delta\theta \sin \psi)$$

therefore:

$$\delta\theta = \frac{\delta n}{n} (\cot \psi) \quad (3)$$

Because of the curvature of the surface 40a of mirror 40, the quantity $\Delta$ is the difference between the angles $\delta\theta$ and $d/R_o$ where:

$$d = (R_o - R)\delta\theta \quad (4)$$

Therefore:

$$\Delta = \delta\theta - \left(\frac{R_o - R}{R_o}\right)\delta\theta \quad (5)$$

$$= \frac{R}{R_o} \delta\theta$$

The total displacement S of ray 66 at the output surface 51a is normally small; therefore, the refractive effects will be substantially the same for light travelling in each of the two directions. In other words, the angular difference between the input and output rays 62, 66 will be substantially $2\Delta$, and this for virtually the entire length of the crystalline plate 33. Accordingly, $$S = 2 \Delta R_o = 2R \delta\theta \quad (6)$$
$$= 2R \frac{\delta n}{n} \cot \psi$$

The displacement S is constant with respect to R (distance 69) only if $R \cot \psi$ is constant. Accordingly, the desired curve 47 is a spiral given in cylindrical coordinates relative to a given light ray by the equation $$\psi \simeq \tan \psi = 2 \frac{R}{S} \frac{\delta n}{n} \quad (7)$$

By way of example, if $S = 0.02$ cm. and $\delta n/n = 10^{-3}$, then $\psi = 5.7°$ for $R = 1.0$ cm. and $\psi = 11.4°$ for $R = 2.0$ cm.

Figure 6:
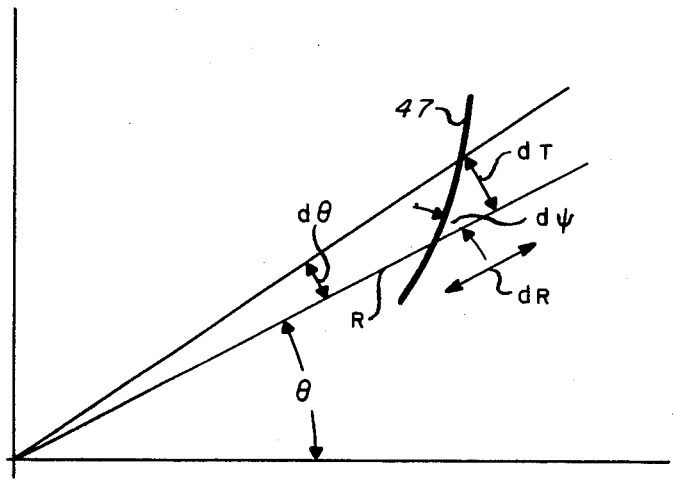

As was previously observed, the angle $\psi$ in FIG. 5 is the angle of the index discontinuity 47 relative to a light ray and what is actually needed is an expression for the curve of discontinuity 47 in coordinates fixed to plate 33. For a light ray subtending an angle $\theta$ with respect to the horizontal, a useful geometry is depicted in FIG. 6; here the tangential distance dT is given by:

$$dT = \psi \delta R = R \delta \theta \qquad (8)$$

Substituting from Equation (7):

$$2\frac{\delta n}{n} \delta R = S d\theta \qquad (9)$$

After final integration:

$$\theta = \frac{2\delta n}{n}\left(\frac{R}{S} - \frac{R_c}{S}\right) \qquad (10)$$

where $\theta$=zero for $R=R_c$. From these relations, it is seen that the desired shape for the curved edge 47 of FIG. 3 is a spiral where the distance R to any point on the curve 47 is a constant multiplied by the angle $\theta$ as defined by FIG. 3. The spiral edge 47 is most tightly wound as it approaches the point 49, where it would end if it were not more convenient simply to end it at edge 46. It is convenient to use a radial edge 45 and a circular arc 48 substantially conformal with the inner surface 40a of cylindrical mirror 40 to complete the boundary of electrodes 35a, 35b. It is desired that the spiral curved edge 47 of the electrode subtend an angle substantially equal to that generated by the cone of light (numerical aperture) of the fiber wave guide 31.

The typical devices of FIGS. 2, 3, and 4 may be used directly as multiplexers or as demultiplexers. In use as a multiplexer as shown in FIG. 2, for example, sinusoidal voltages are applied from source 39 to the opposed electrodes 35a, 35b through an inductor 27 normally arranged to provide resonance with the effective capacitance of the electrodes. The sinusoidal drive causes the light beam from fiber guide 31, after reflection, to be swept sinusoidally across surface 29. With output optical fiber guides such as fibers 30, 32, butt coupled at suitable positions along surface 29, the sinusoidal drive circuit 39 repeatedly causes the input light of fiber guide 31 to address each respective output fiber guide 30, 32, at the extreme positions of sinusoidal scan in the general manner taught in the McMahon U.S. patent application Ser. No. 879,309 for an "Electro-Optical Multiplexer Having Multiple Frequency Resonance Excitation," filed FEB. 21, 1978, and assigned to Sperry Rand Corporation.

In typical operation, the light emitted by a fiber guide is unpolarized; because the electrooptic coefficient of TM polarized light propagated within crystal 33 is about four times as large as that coefficient for TE polarized light, the sinusoidal or other drive furnished by source 39 will separate the two polarization components on a spacial basis. For the 2:1 multiplexer of FIG. 3, this spatial separation causes little detrimental effect other than a partial collection loss of TE polarized light. If desired, the TE polarization component may be substantially eliminated by inserting a polarization filter 50 as seen in FIGS. 3 and 4 at the input-output surface 29. Substantial elimination of the TE mode light level may be achieved in this manner, if desired. Accordingly, it is seen that the invention may be used in either single or dual mode propagation systems.

Propagation may be controlled according to polarization in the alternative manner in the 4:1 multiplexer illustrated in FIG. 7 wherein the output fiber guides 52, 54, 55, 56 are spaced symmetrically but unevenly about the central input fiber guide 53. Assuming that TM light is deflected so far as to reach output fiber guides 55 or 56, the TE polarized light will not be deflected sufficiently to reach output fibers 52 or 54. Hence, the TE polarized light has no role in the multiplexing operation and a substantially 3 dB. loss results. The insertion loss of the device is significantly lower than that of the polarization filter 50 of FIGS. 3 and 4 and the structure is simpler to fabricate.

FIG. 7 also indicates that, as illustrated in the aforementioned patent application Ser. No. 856,424, now U.S. Pat. No. 4,143,941, the mirror 40 may take different forms and, in fact, may be a separate structure coated upon a polished concave surface of a separate substrate 74, the curvature of mirror 40 being slightly different from the curvature of the end 76 of the electrooptically active crystal 33. The surfaces 40a and 76 make a centrally located line contact perpendicular to the drawing and the gap between the surfaces is otherwise filled as at 75 with a fluid such as a silicone oil (n=1.55) to keep optical scattering and reflection losses at those interfaces at a very low value and to minimize any effects of polishing defects on the crystal surface. In addition, if in FIG. 5, $R_o > 2$cm., it is possible to use an external spherical mirror at 40 rather than one of cylindrical shape, the optical losses introduced by the substitution being small.

Typical experiments were carried out with a configuration similar to that of FIGS. 1, 2, and 3, but using the separate cylindrical mirror configuration of FIG. 7. The planar input-output surface 51 and the cylindrical end 76 of a 74 micron thick Z-cut single-crystal LiTaO$_3$ plate 33 (FIG. 7) were optically machine polished. The maximum length of the crystal (between end 51 and the mid-point of surface 76) was 4.97 cm. and the radius of cylindrical end 76 was also 4.97 cm. An external mirror 40 was cemented to the uncoated curved end 76, the 0.01 cm. gap between the crystal 33 and the mirror being filled with an n=1.6 index matching liquid. The gold-coated first-surface mirror 40 was concave and spherical with a 5.00 cm. radius of curvature. The crystal-mirror combination proved to focus light at a plane 0.04 cm. beyond (outside of and parallel to) the crystal's flat end 51. Electric fields were applied parallel to the crystal z-axis, so the $r_{13}$ and $r_{33}$ electrooptic coefficients apply for TE and TM polarized light, respectively. The identical gold-on-chromium spiral-edged electrodes 35a, 35b on opposed surfaces of a 3 mil thick LiTaO$_3$ or LiNbO$_3$ crystal 33 were derived using values of $R_o = 5.100$ cm., S=250 microns, and $\delta n/n = 10^{-3}$ for TM polarization. This implies that E=2 volts per micron across the crystal.

The 600 picofarad capacitor representing deflection plates 35a, 35b was series-resonated with a 35 microhenry high-Q air-core inductor 27 at a frequency of 1.1 MHz. Multiplexing was attained using a voltage source 39 that supplied a 3.6 volt rms sine wave (10 volts peak-to-peak) to the circuit. This developed a 430 volt peak-to-peak potential across the multiplexer terminals 28a, 28b. A close-spaced array of three multi-mode all-glass monofibers (85 microns core diameter, 125 microns cladding diameter, and 125 microns center-to-center spacing) was butt coupled at normal incidence to the multiplexer face 29. A thin (0.02 cm.) plastic sheet polarizer 50 was interposed in the 0.04 cm. gap between crystal 33 and the fiber array so that the incoming and outgoing light was TM polarized. To minimize reflection losses, an n=1.6 index matching liquid filled the various interstices. The middle fiber 31 of the trio was positioned at the mirror's center of curvature, and its free end was excited with focussed light from a cw He-Ne laser ($\lambda=0.63$ microns) that filled the fiber's 0.2 numerical aperture.

Because of optical reciprocity, the tested device readily functioned as a 2:1 multiplexer or a 1:2 demultiplexer. The alternating polarity drive switched the input light alternately from one output fiber to the other on each half-cycle, giving the desired time-dissection of the optical signal. The resonant ±215 volt drive gave 90 percent of the maximum possible transmission and the extinction ratio was 20-to-1.

Improved operation may be achieved by the use of more than one effective prism for two or higher stage light deflection as illustrated in FIGS. 8 through 11. Considering FIG. 8, a configuration generally similar to that of FIGS. 3 and 4 is shown. However, the device employs a first pair of deflector electrodes 85a, 85b with two intersecting straight sides 86 and 88, side 88 being parallel to the input-output face 51. The third side 87 of electrode 85a, for instance, begins at side 88 opposite side 86 and extends upwardly in a spiralling manner to contact a remote upper end of side 86. The opposed plates 85a, 85b are respectively excited at a first frequency at terminals 90a, 90b.

The second electrode pair 80a, 80b resides between and is isolated from the curved edges 87 of electrodes 85a, 85b and the cylindric mirror 40. Electrodes 80a, 80b each have a spiral edge 83 generally conformal with edge 87 to form gap 84, a circular edge 81 conformal with mirror 40, and a straight edge 82. Electrodes 80a, 80b are normally electrically excited at a second frequency via terminals 89a, 89b.

Figure 9:
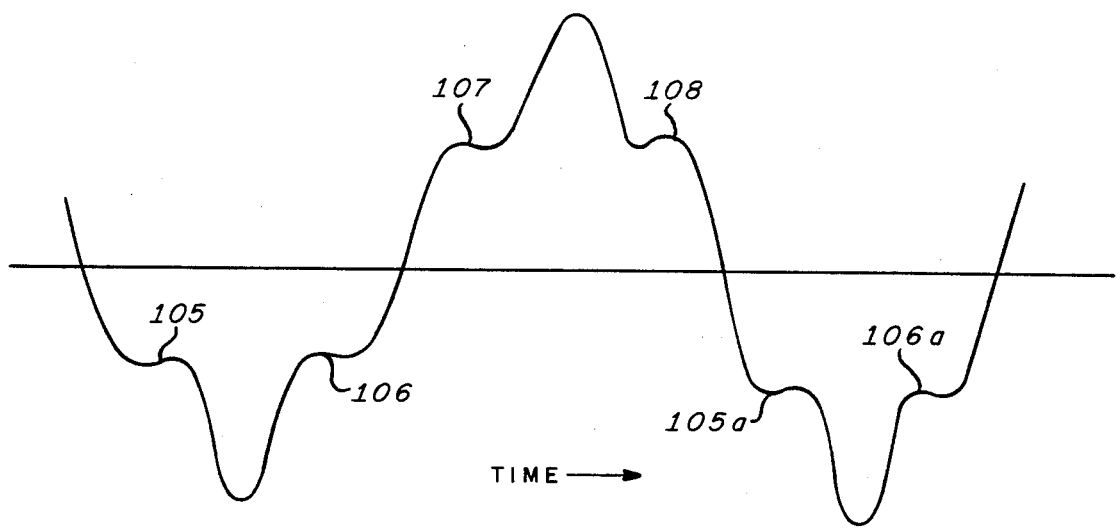
FIG. 9 is a graph of a wave form useful in explaining the invention.
Figure 11:
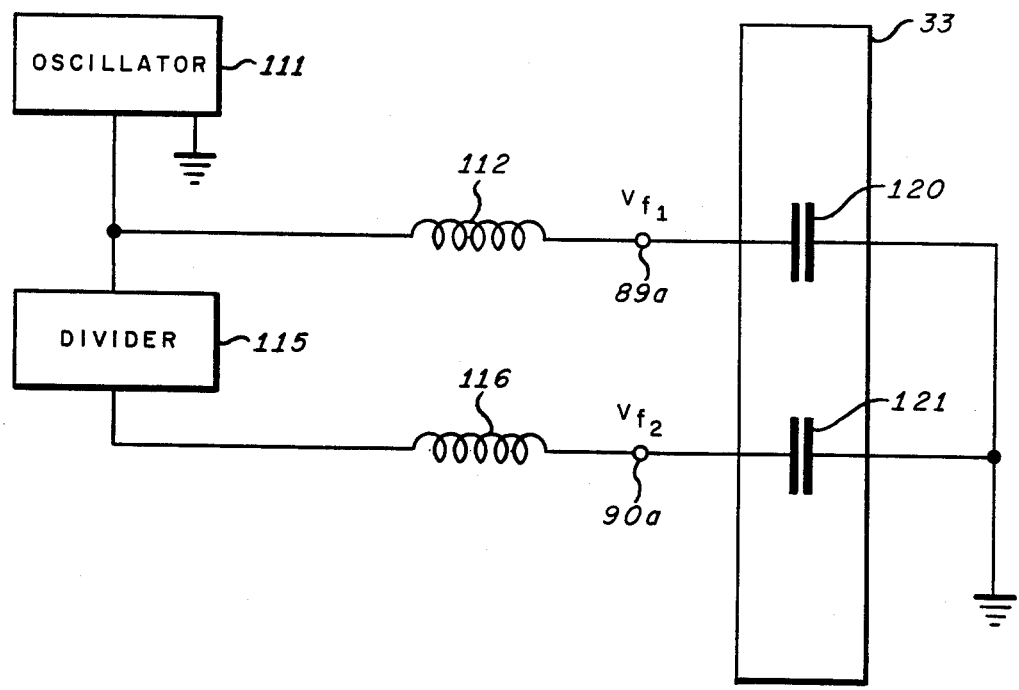
FIG. 11 is a block diagram showing electrical components and interconnections of a circuit for driving the apparatus of FIG. 8.

Each pair of electrodes is separately tuned to a different harmonic frequency and is excited at resonance as shown in FIG. 11. One beneficial form of such doubly resonant excitation produces an effective total light beam displacement proportional to:

$$\sin t + \frac{1}{6} \sin 5 t$$

for which the light beam becomes, as shown in FIG. 9, stationary at four separate displacements 105, 106, 107, 108 for each fundamental voltage cycle.

According to the present invention, electrical driving of the configuration of FIG. 8 is accomplished by the driving circuit of FIG. 11, wherein master oscillator 111 provides a high frequency $f_1$ coupled through resonating inductance 112 and terminal 89a to one side of capacitor 120, which capacitor 120 represents the capacitance between electrodes 80a, 80b.

Oscillator 111 also feeds the $f_1$ signal to a conventional divider circuit 115, whose lower frequency $f_2$ output is coupled through inductance 116 to terminal 90a of one side of capacitor 121, which capacitor represents the capacitance between electrodes 85a, 85b of FIG. 8. In the present example, divider 115 is a divide-by-five counter. With this type of excitation, higher light transmission efficiency is assured because more time is spent sending the light beam in the actual direction of a fiber position. Consequently, less time is spent directing the light to positions intermediate the output fiber guides. It will be understood that frequency ratios other than 1:5 may be used and that efficiency may be improved by experimental adjustment of the phases of the driving fields.

These principles may be extended in the device of FIG. 10 to use three harmonically related signals at the respective terminals 90a, 90b; 95a, 95b; 89a, 89b, according to generally similar rules. Here, the electrode pair 85a, 85b is generally similar to the pair 85a, 85b found in FIG. 8 and the electrode pair 80a, 80b is generally similar to the pair 80a, 80b in FIG. 8. The shapes of the foregoing electrodes are modified, however, so that a third pair of electrodes 94a, 94b may be interposed on opposed sides of the crystal 33, generally spiral electrode edges 96, 97 being electrically isolated from associated electrode pairs by cooperating gaps 98, 99. A circuit analogous to that of FIG. 11 will be readily visualized for the cooperative driving of the FIG. 10 device.

Figure 12:
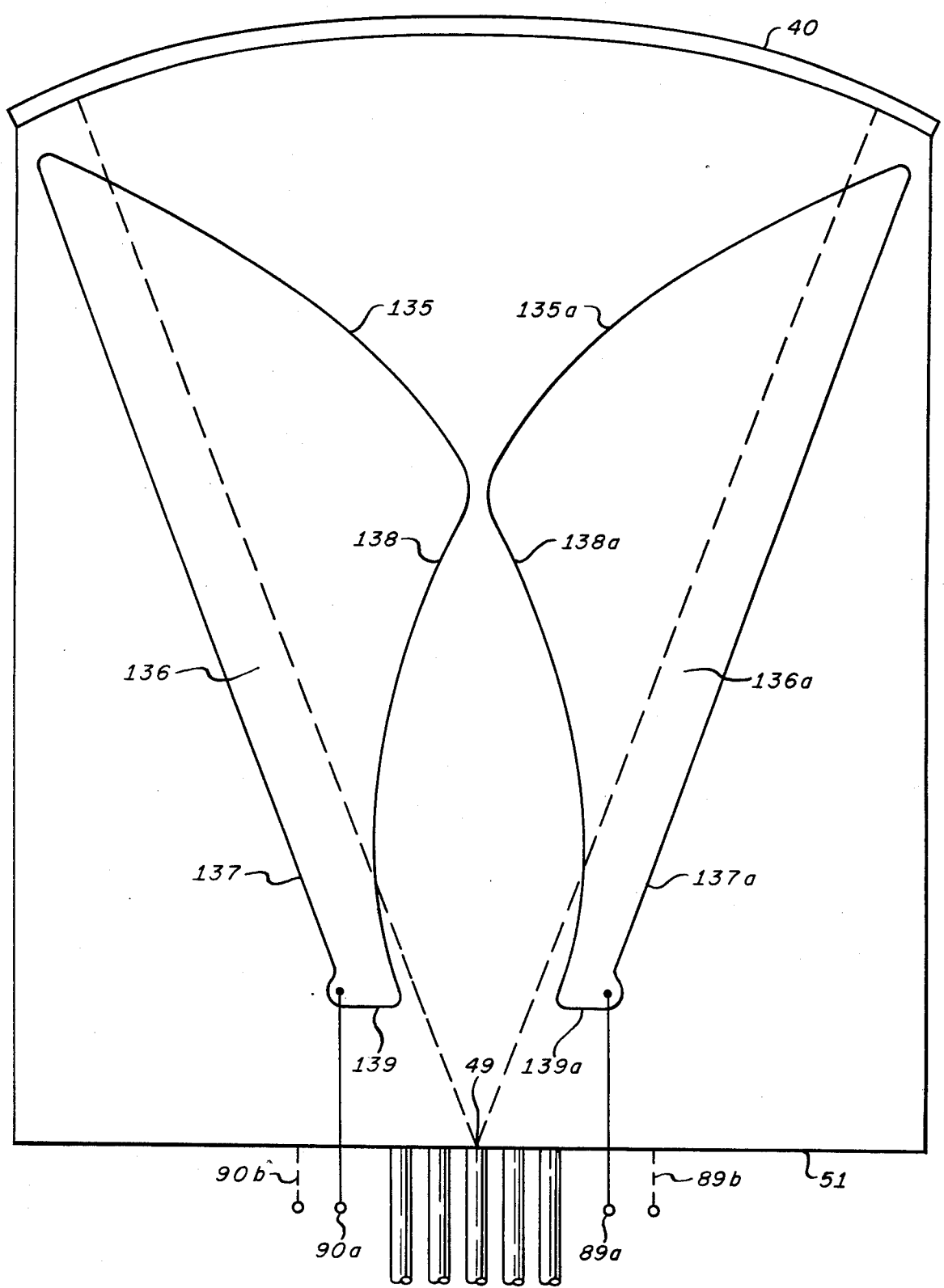
FIG. 12 is a plan view of an alternate form of the apparatus of FIGS. 3, 7, and 8.

Improved operation may also be achieved by the use of more than an effective or induced prism as illustrated in FIG. 12. Two pairs of electrodes 136 and 136a are employed in mirror image configuration. Referring to the upper surface electrodes 136, 136a seen in FIG. 12, electrode 136 has oppositely curved edges 135, 138 and straight edges 137, 139, the other electrode 136a having oppositely curved edges 135a, 138a and straight edges 137a, 139a. Referring to electrode 137, its first spiral edge 138 begins at straight edge 139 having highest curvature there, while its second spiral edge similarly extends from the region of closest proximity of electrodes 137, 137a. For operation, a voltage is placed on leads 90a and 89b and a reversed polarity voltage is placed on leads 90b and 89a. Then, light traveling through the regions of index discontinuity induced by spiral edges 138, 135, for example, will be deflected in the same direction along the output surface 51 and will form a common focus with light refracted by the prism edges 138a, 135a.

The purpose of the symmetrical structure shown in FIG. 12 is to reduce higher order optical aberration present in the focal properties of the asymmetric structures of the preceding figures. The latter exhibit slightly different focal positions for light emanating from or entering fibers placed at positions other than the focal point 49 of the cylindrical mirror 40. This change in focal position depends on the radial distance R of FIG. 3 at which light strikes the electrooptically induced index discontinuity. Again, it will be understood that the proportions and dimensions illustrated in FIGS. 3, 7, 8, 10 and 12 are not necessarily those that would be selected by an expert for use in a particular application of the invention. For example, the diameters and spacings of the 3 mil optical fiber guides 52 through 56 are exaggerated in the interest of clarity.

Figure 13:
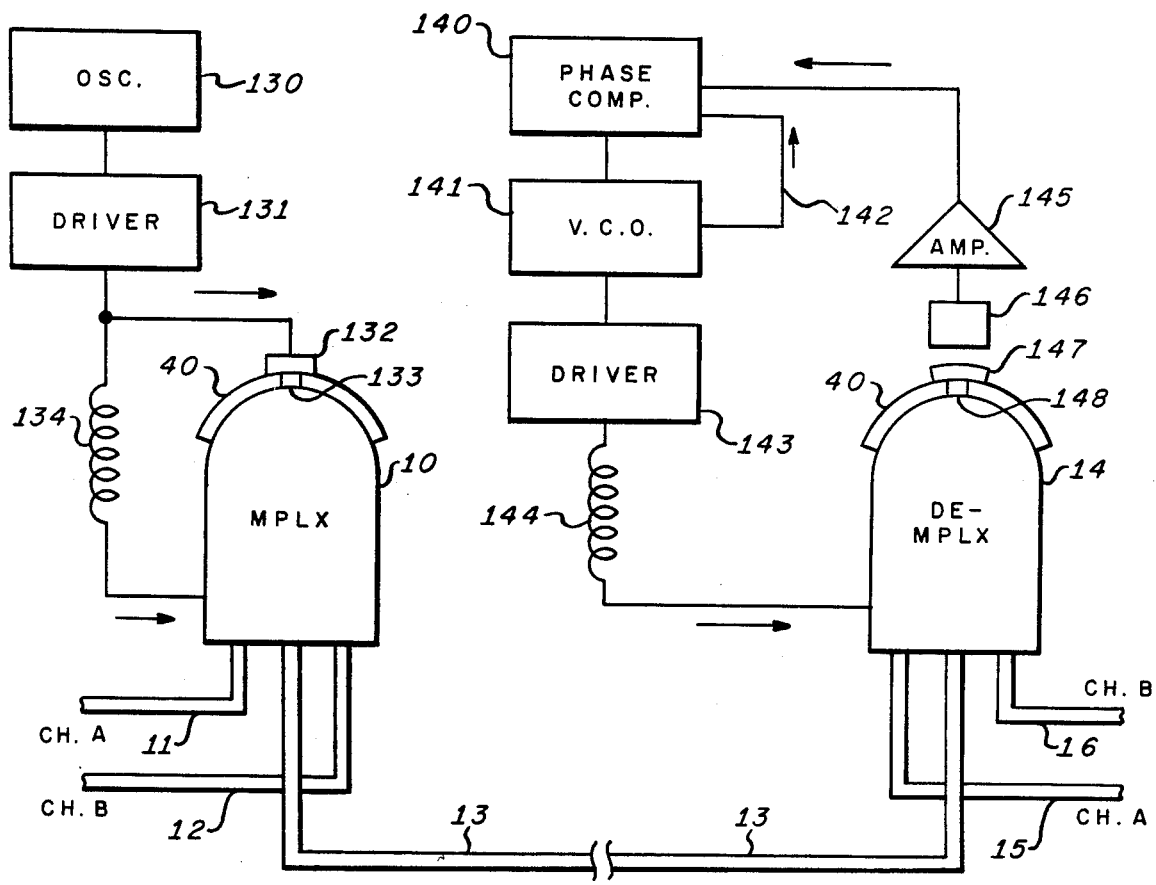
FIG. 13 is a block diagram showing optical components and electrical components and their interconnections in an arrangement permitting synchronous operation of the multiplexer and demultiplexer system.

While any of several conventional ways may be employed to synchronize the operation of the multiplexer-demultiplexer system, FIG. 13 illustrates a preferred and novel method of performing this function with precision and simplicity. In this arrangement, elements common to FIG. 1 bear the same reference numerals. Preferably, the same optical fiber wave guide 13 that carries the multiplexed data also carries the synchronization signal and the synchronizer arrangement, in general, introduces no constraints on the design of the remainder of the system.

At the multiplexer 10, a small central portion at 133 of the cylindrical mirror 40 is removed and a light-emitting diode 132 is placed over opening 133 so as to project light into multiplexer 10. Diode 132 emits light at a wave length separated from that carrying the primary transmitted data. Thus, the optical synchronizing signals are focussed into guide 13 along with the primary data. Since the pulsed diode 132 is driven by the same driver 131 (in synchronism with oscillator 130) that resonantly drives the internal electrodes of multiplexer 10 through inductance 134, they are consequently synchronously operated.

At the demultiplexer 14, mirror 40 is again equipped with a central opening 148; opening 148 is covered by a filter 147 passing the narrow spectrum of diode 132. Light passing through guide 13, demultiplexer 14, aperture 148, and filter 147 is sufficient to excite optical detector 146, whose output may be amplified, if desired, by amplifier 145 and supplied to a conventional phase comparator 140. Voltage-controlled oscillator 141 supplies a stable output, synchronized with respect to the output of driver 131, through driver 143 and the resonating inductance 144 to the internal electrodes of demultiplexer 14. Voltage controlled oscillator 141 supplies a version of its output via lead 142 for phase comparator 140, thus forming a phaselocked loop in the usual manner. For example, diode 132 may emit red light, while the multiplexed data is separated therefrom in the infrared spectrum. The red light is modulated, for example, in synchronism with the sine wave voltage applied to the internal electrodes of multiplexer 10. The red light detected by detector 146 of demultiplexer 14 is used in the phase-locked loop 140, 141, 142 to control the voltage applied to the demultiplexer electrodes. If desired, red blocking filters may be placed at the inputs of the demultiplexed date lines 15, 16 to defeat any interference effects that may be present.

It is seen that the present invention is an improvement in the art of optical switching, multiplexing and demultiplexing useful in a variety of optical data processing systems of which one form has been illustrated by way of example. The novel switching device is reciprocal in nature, so that it readily acts as a multiplexer or as a demultiplexer. It handles polarized fiber light with large numerical aperture. Its low insertion loss makes it useful in plural numbers in series connection or other arrangements so that many peripheral data sources may cooperate with a central data processor, for example. It is essentially achromatic and, using normal-incidence butt-coupling of the input-output fiber guides, it is simple, compact, rugged, and easily constructed with no difficult alignment problems in manufacture.

The invention, because of the spiral-edge deflection plates, assures that all components of the light cone emitted by the input fiber guide are deflected into the aperture of a single output fiber guide, independent of the magnitude of the corresponding deflection voltage required to deflect the light beam into that guide. Because the preciseness of focussing is independent of the deflection voltages used to direct the light to different positions, efficiency and signal-to-noise ratios are improved.

Further, if desired, the TE polarization component may be substantially eliminated by insertion of a polarization fiber at the input-output surface. Appropriate spacing of the output fiber guides along the input-output surface may also be advantageously employed to eliminate any role of the TE component.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An optical switching device comprising
   a plate of electrooptically active material having first and second opposed major surfaces,
      said plate having a focal surface substantially perpendicular to said opposed major surfaces,
      said plate additionally having a cylindric surface opposite said focal surface,
   cylindrical reflector means opposite said focal surface at said cylindric surface,
   at least one light guide means in abutting relation with said focal surface for illuminating a major portion of said reflector means with a diverging light beam,
   at least second light guide means in abutting relation with said focal surface and spaced from said one light guide means for collecting a converging light beam reflected by said cylindrical reflector means, and
   first and second electrode means for placing a selectable predetermined electric field between opposed portions of said opposed major surfaces whereby substantially all the light from said one light guide means is coupled into said second light guide means,
   said first and second electrode means being so shaped as to cause said diverging and said reflected converging light beams each to intersect a spiral-shaped index of refraction discontinuity within said plate of eectrooptically active material in the presence of said electric field for cooperatively deflecting said light beams and for focusing said converging light beam substantially totally into said second light guide means.

2. Apparatus as described in claim 1 wherein said spiral-shaped index of refraction discontinuity is generated in the presence of said electric field between spiral-shaped edges of said first and second electrode means, one edge being disposed in aligned relation with the other.

3. Apparatus as described in claim 2 wherein said spiral-shaped edges each subtend the angle substantially equal to that generated by said diverging light beam.

4. Apparatus as described in claim 3 wherein said spiral-shaped edges are defined by a spiral wherein the distance vector R to any point on the spiral from the locus of said one light guide means at said focal surface is equal to a constant multiplied by the angle between said distance vector R and a first boundary of said diverging light beam.

5. Apparatus as described in claim 3 wherein the portion of said spiral-shaped edges having greatest curvature is disposed adjacent and directed toward the locus of said one light guide means at said focal surface.

6. Apparatus as described in claim 5 wherein said electrooptically active material is a material selected from the class of materials including $LiTaO_3$ and $LiNbO_3$.

7. Apparatus as described in claim 5 wherein first and second dielectric layers are disposed respectively on said first and second opposed major surfaces at said first and second electrode means, said dielectric layers acting as wave guiding plates in the plane perpendicular to said electrooptically active plate.

8. Apparatus as described in claim 5 wherein said focal surface is planar.

9. Apparatus as described in claim 8 wherein a linear array of at least first, second, and third multimode light guides is affixed in abutting relation at said planar focal surface.

10. Apparatus as described in claim 8 wherein said cylindrical reflector means has a circularly cylindric surface having a center of curvature lying substantially symmetrically at said planar focal surface.

11. Apparatus as described in claim 10 in which said circularly cylindric surface comprises an optically reflecting metal film affixed to said electrooptically active material.

12. Apparatus as described in claim 9 wherein said multi-mode light guides comprise fiber optic guides.

13. Apparatus as described in claim 7 wherein said dielectric layers have an index of refraction lower than the index of refraction of said electrooptically active material.

14. Apparatus as described in claim 2 further including resonant excitation means for exciting said electric field.

15. Apparatus as described in claim 2 additionally including means for exciting said electric field comprising:
circuit means including inductive means coupled in series relation with said first and second electrode means for the resonant excitation of the effective capacitance formed between said first and second electrode means, and
driver signal source means for driving said circuit means.

16. Apparatus as described in claim 9 further including:
means for exciting a cyclically varying electric field across said electrooptically active plate,
said first and third multi-mode light guides being symmetrically disposed about said second multi-mode light guide, whereby in the presence of said varying electric field, light propagating in said second multi-mode light guide is cyclically and alternately directed into said first then into said third multi-mode light guide and vice versa.

17. An optical switching device comprising a plate of electrooptically active material having first and second opposed major surfaces,
said plate having a focal surface substantially perpendicular to said opposed major surfaces,
said plate additionally having a cylindric surface opposite said focal surface,
cylindrical reflector means opposite said focal surface at said cylindric surface,
at least one light guide means in abutting relation with said focal surface for illuminating a major portion of said reflector means with a diverging light beam,
at least second light guide means in abutting relation with said focal surface and spaced from said one light guide means for collecting a converging light beam reflected by said cylindrical reflector means,
first and second opposed electrode means for placing a first predetermined electric field between first opposed portions of said opposed major surfaces, and
third and fourth opposed electrode means for placing a second predetermined electric field between second opposed portions of said opposed major surfaces,
at least said first and third electrode means being disposed in coplanar electrically isolated relation by spiral gap means whereby said first and second electric fields, when present, interact to produce a variable index of refraction discontinuity at said spiral gap within said optically active material.

18. Apparatus as described in claim 17 wherein said spiral gap means subtends the angle substantially equal to that generated by said diverging light beam.

19. Apparatus as described in claim 18 further including:
first circuit means for resonantly exciting a first electric field between said first and second electrode means at a first frequency, and
second circuit means for resonantly exciting a second electric field between said third and fourth electrode means at a second frequency, said first and second frequencies being harmonically and synchronously related.

20. Apparatus as described in claim 16 wherein:
said first circuit means includes:
oscillator means, and
first inductive means serially coupled between said oscillator means and said first electrode means, and
said second circuit means includes:
frequency divider means responsive to said oscillator means, and
second inductive means serially coupled between said divider means and said third electrode means.

21. Apparatus as described in claim 17 wherein the portion of said spiral gap means having greater curvature is disposed adjacent and directed toward the locus of said one light guide means at said focal surface.

22. An optical switching device comprising a plate of electrooptically active material having first and second opposed major surfaces,
said plate having a focal surface substantially perpendicular to said opposed major surfaces,
said plate additionally having a cylindric surface opposite said focal surface,
cylindrical reflector means opposite said focal surface at said cylindric surface,
at least one light guide means in abutting relation with said focal surface for illuminating a major portion of said reflector means with a diverging light beam,
at least second light guide means in abutting relation with said focal surface and spaced from said one light guide means for collecting a converging light beam reflected by said cylindrical reflector means, and
first and second opposed electrode means for placing a predetermined electric field between first opposed portions of said opposed major surfaces,
third and fourth opposed electrode means for placing a second predetermined electric field between second opposed portions of said opposed major surfaces,
fifth and sixth opposed electrode means for placing a third predetermined electric field between third opposed portions of said opposed major surfaces,
at least said first, third, and fifth electrode means being disposed in coplanar electrically insulated relation by first and second spiral gap means whereby said first and second electric fields, when present, interact to produce a first variable index of refraction discontinuity at said first spiral gap means within said electrooptically active material and whereby said second and third electric fields, when present, interact to produce a second variable index of refraction discontinuity at said second spiral gap means within said electrooptically active material.

23. Optical apparatus for the synchronous multiplexing of optical data propagating in a first discrete spectral region between at least a pair of input optical wave guide means and a single multiplexer output optical wave guide means comprising:

synchronizer means, electrooptical multiplexer means for selectively directing optical data propagating in said pair of input optical wave guide means into said multiplexer output optical wave guide means in response to said synchronizer means, and light source means operating in a second discrete spectral region for transmitting optical synchronizing signals through said electrooptical multiplexer means into said multiplexer output optical wave guide means in response to said synchronizer means.

24. Apparatus as described in claim 23 further including apparatus for the synchronous demultiplexing of optical data propagating in said single multiplexer output optical wave guide means comprising:

electrooptical demultiplexer means for selectively directing optical data propagating in said multiplexer output optical wave guide means into first and second demultiplexer output optical wave guide means while permitting a portion of said optical synchronizing signals to propagate through said demultiplexer means, optical filter means external of said demultiplexer means for passing said synchronizing optical signals while eliminating said optical data, optical detector means responsive to said filtered optical synchronizing signals, and phase-locked loop means including voltage controlled oscillator means responsive to said optical detector means, said electrooptical demultiplexer means being responsive to said phase locked loop means for synchronously demultiplexing said optical data propagating in said multiplexer output optical wave guide means.

25. Apparatus as described in claim 1 wherein:

said first and second electrode means are so shaped as to cause said diverging and said reflected converging light beams each to intersect successive first and second spiral shaped index of refraction discontinuities within said plate of electrooptically active material in the presence of said electric field for cooperatively deflecting said light beams.

* * * * *